Figure 7:
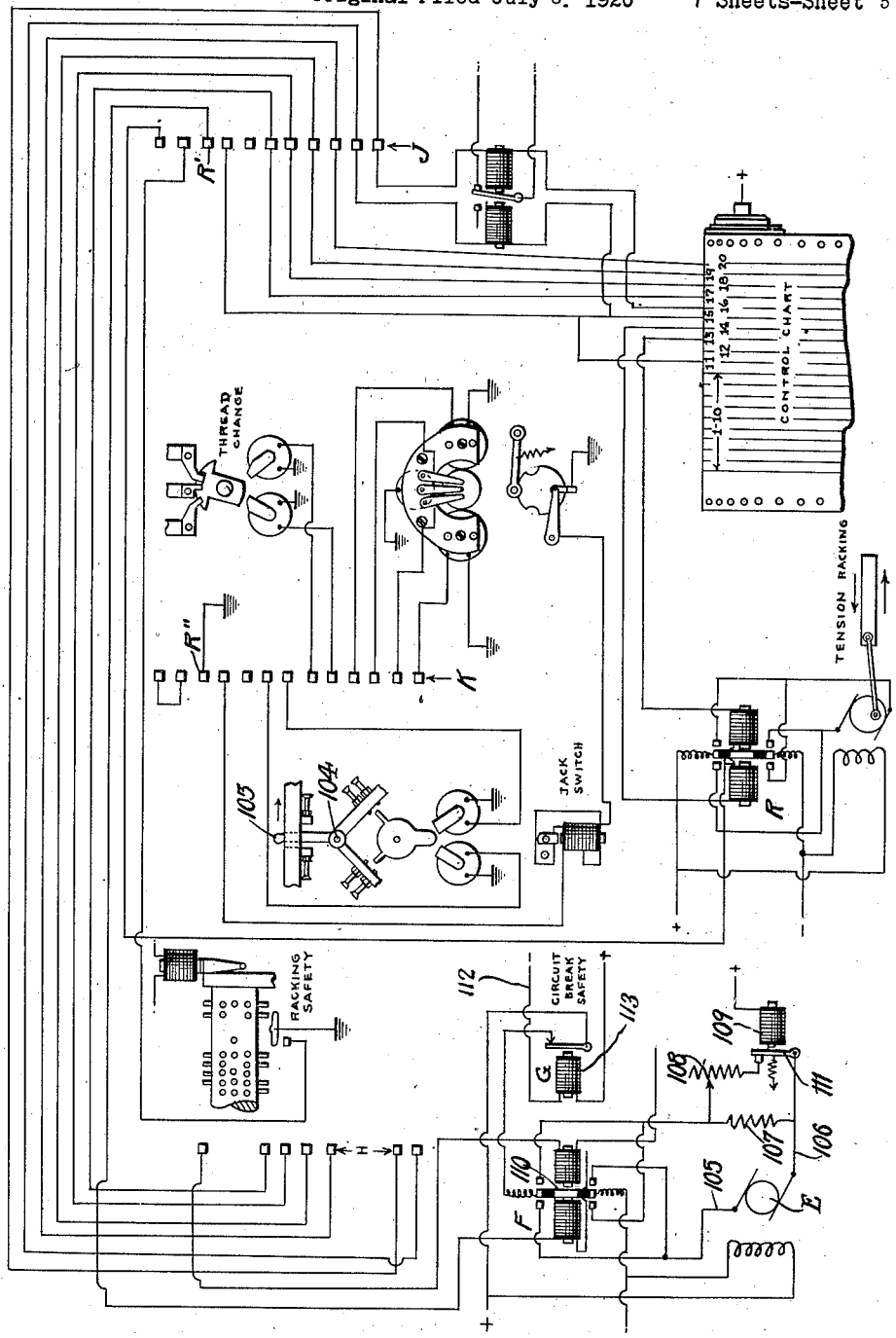

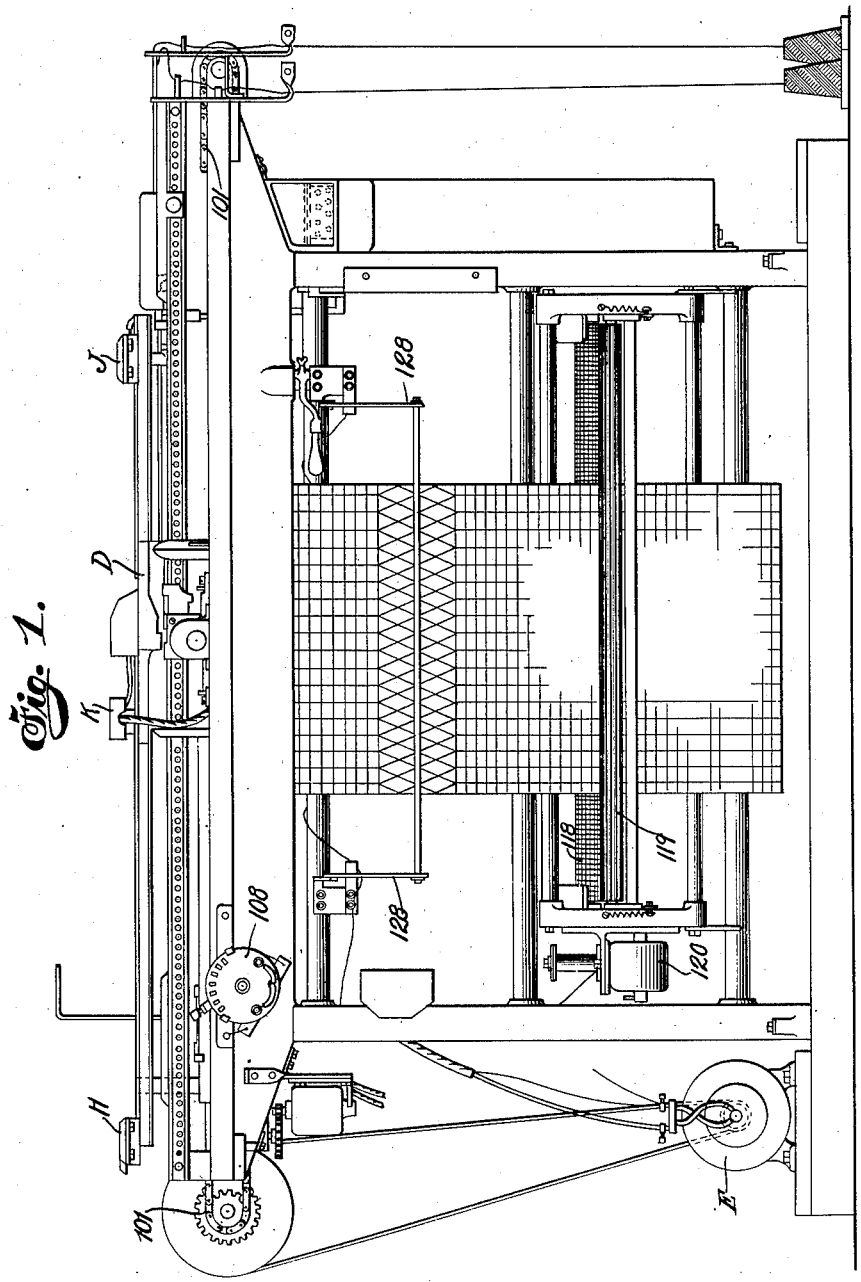

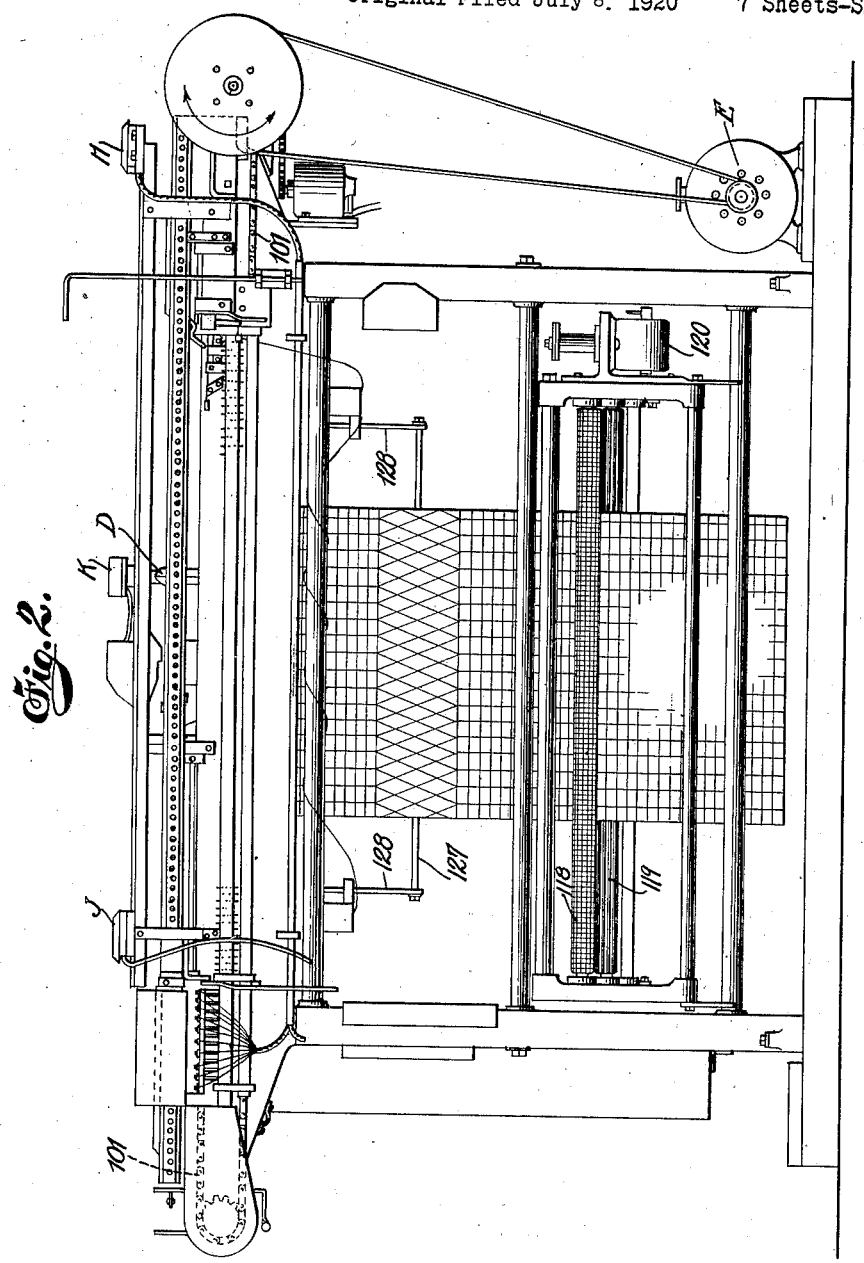

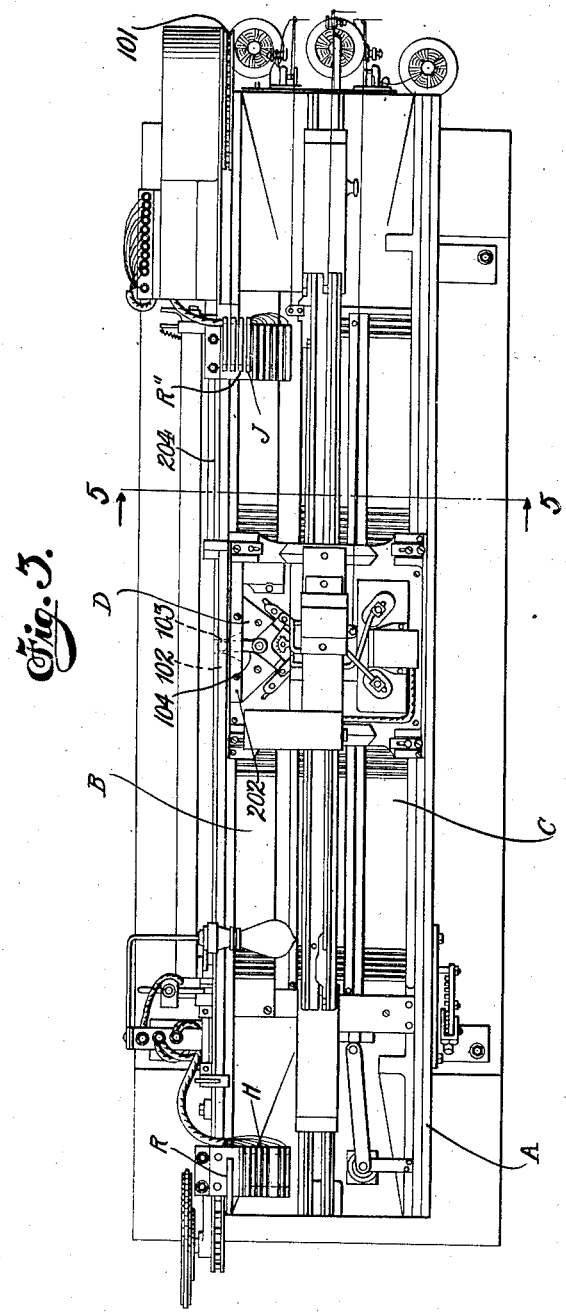

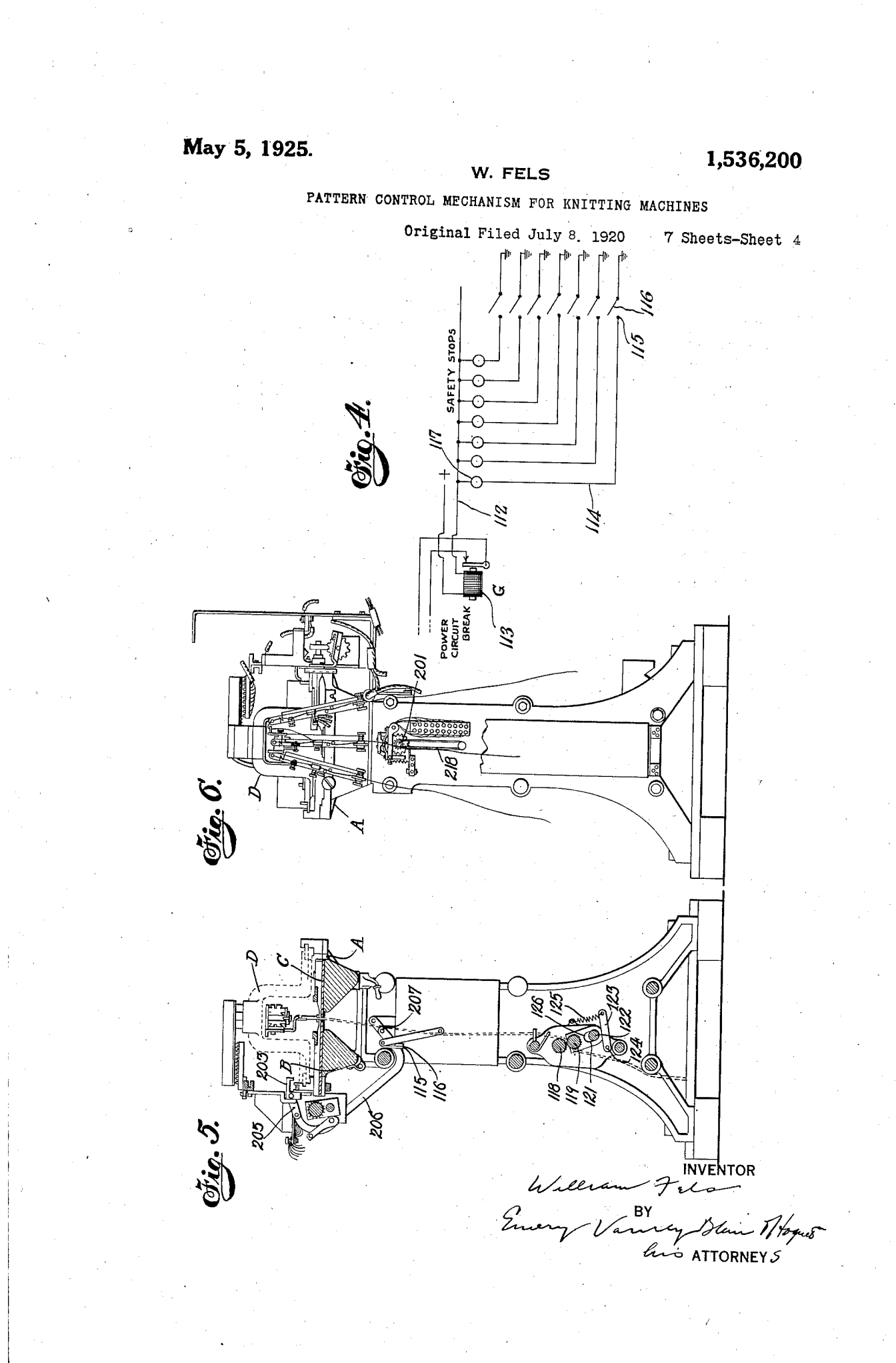

May 5, 1925.                                                    1,536,200
W. FELS
PATTERN CONTROL MECHANISM FOR KNITTING MACHINES
Original Filed July 8, 1920          7 Sheets-Sheet 4

INVENTOR
William Fels
BY
Emery Varney Blair & Hogue
his ATTORNEYS

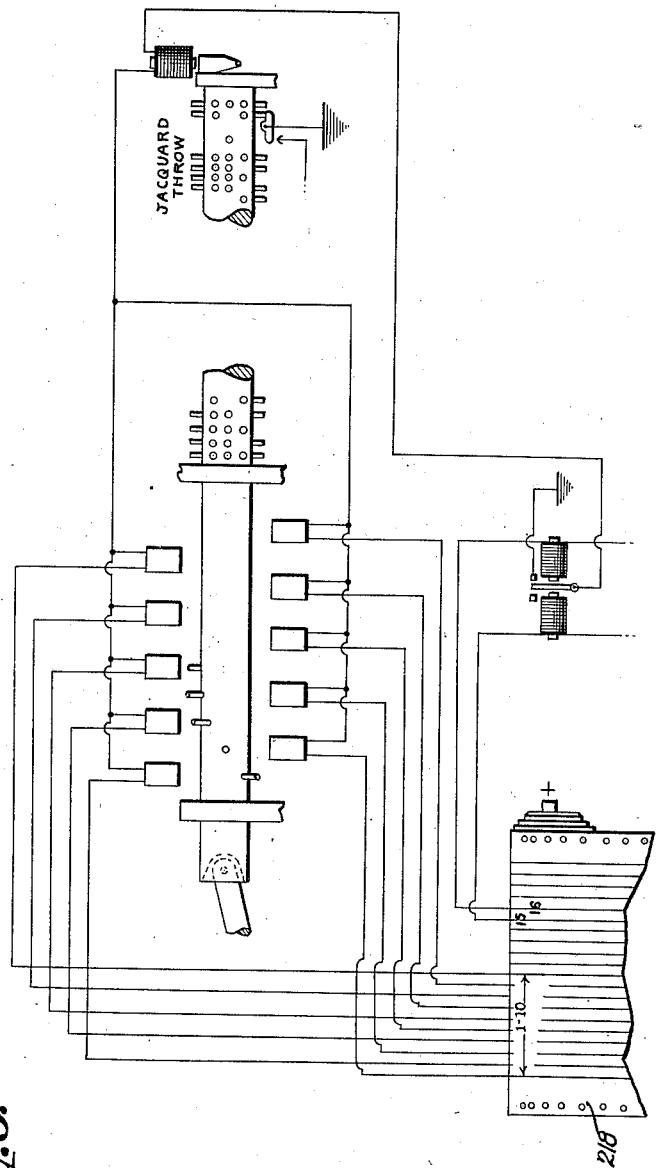

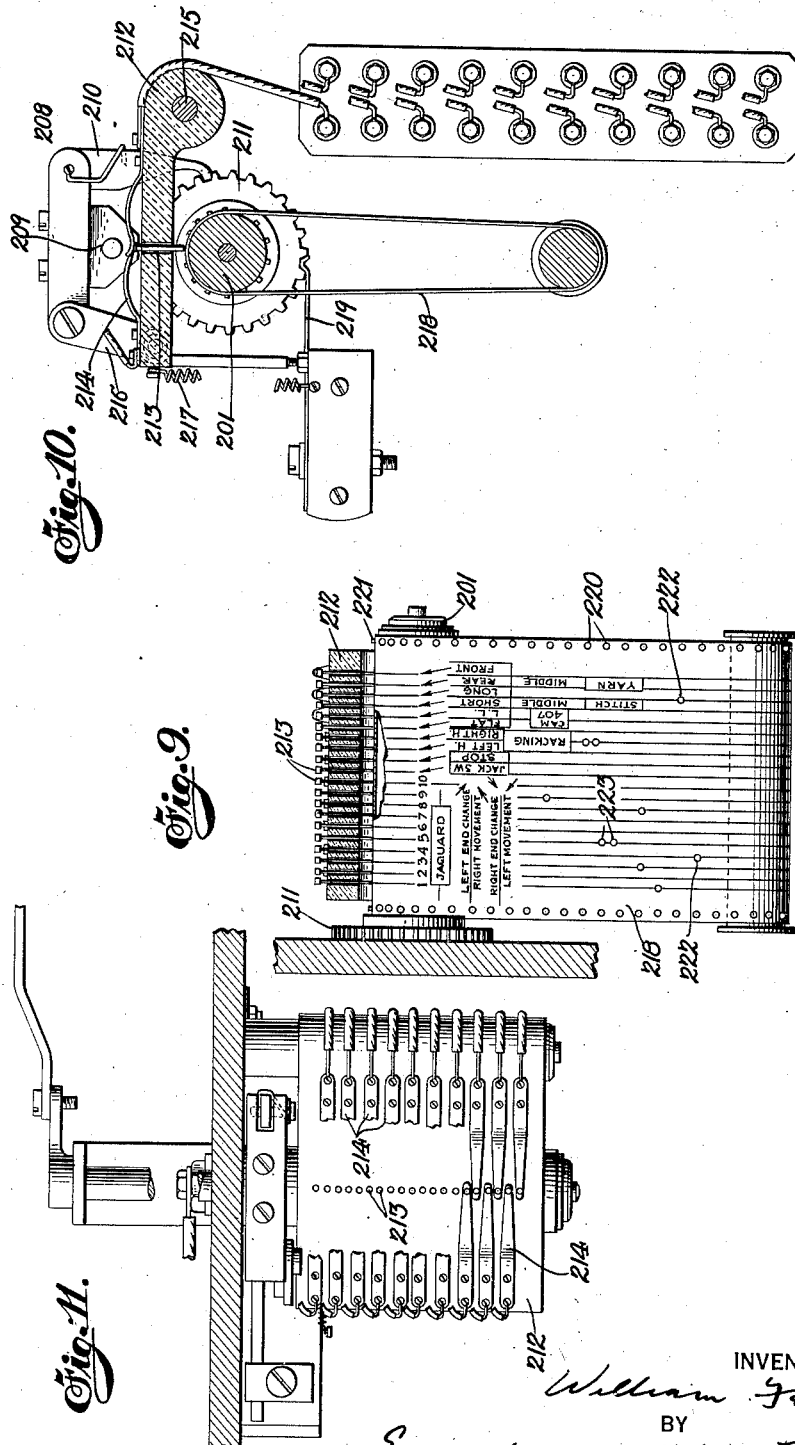

Patented May 5, 1925.

1,536,200

UNITED STATES PATENT OFFICE.

WILLIAM FELS, OF ELBERTA, ALABAMA, ASSIGNOR TO MAX NYDEGGER, OF ELIZABETH, NEW JERSEY.

PATTERN-CONTROL MECHANISM FOR KNITTING MACHINES.

Original application filed July 8, 1920, Serial No. 394,678. Divided and this application filed September 3, 1921. Serial No. 498,310.

*To all whom it may concern:*

Be it known that I, WILLIAM FELS, a citizen of Austria, residing in Elberta, county of Baldwin, and State of Alabama, have invented an Improvement in Pattern-Control Mechanism for Knitting Machines, of which the following is a specification.

The present invention relates to an improvement in knitting machines and more particularly to pattern control mechanism therefor. One object has been to provide a machine which shall be automatic in a greater or less degree and at the same time of relatively simple construction with a minimum of mechanically controlled and actuated parts. A further object has been to provide relatively simple means for preventing injury to the machine in case of careless or erroneous operation.

It is known that knitting machines, automatic in varying degrees, have been devised but these machines are usually of complicated design and involve a multiplicity of mechanical movements which not only make the machine expensive to manufacture, but also cause frequent breakdowns and make it necessary for the operator to devote considerable attention to repairs and adjustments.

According to the present invention, I utilize substantially the well known framework and opposed front and rear needle beds of a flat links links machine, although I do not intend to limit the application of the present invention to machines of this type, it being contemplated that the same or similar principles of operation may be applied to other types of knitting machines with suitable modifications. In connection with the flat double bed machine, I use stitch forming means including a reciprocating carriage automatically reversible in direction and which carries with it suitable means for effecting changes in the positions of the jack actuating cams to produce corresponding changes in the stitch length, also cam positioning means for controlling the action of the needle jacks to produce either flat or links links operation according to a predetermined order, and also means for engaging and disengaging a plurality of thread carriers to vary the color scheme of the fabric according to a predetermined arrangement.

Another feature of my improved knitting machine is the fabric tension device which effects a steady and uniform pull on the knitted web at all times and which is preferably combined with a safety stop motion arranged to stop the machine automatically upon the occurrence of a predetermined degree of deviation from the established tension.

Co-operating more particularly with the links to flat change portion of the mechanism arranged on the carriage, is a jack engaging device for automatically selecting jacks or combinations of jacks and moving them into and out of operative position. This device may conveniently be referred to as a jacquard and is intended to perform automatically, and without stopping the machine, substantially the same functions which are now commonly performed only by hand in the case of knitted fabrics of complicated design.

Further elasticity in the operation of the machine and in the character of the fabric produced is permitted by the provision of racking mechanism arranged to operate only in conjunction with or subsequent to a predetermined arrangement of the jacks and needles, said arrangement and said racking being effected automatically and without stopping the machine.

It is contemplated that all or part of the functions or operations hereinabove referred to and relating to pattern variation may be controlled automatically and by electrical means through the instrumentality of a suitable pattern chart having perforations arranged in the path of contacts, said contacts forming part of electrical circuits connected with and controlling the operation of various change mechanisms of the machine. Thus, the chart may be rotated around the periphery of a drum in such a way that perforations will occur in predetermined relative positions in the path of the contacts and at the proper time to effect corresponding changes in the operation of the machine and thus in the pattern of the fabric. Pattern control mechanism to effect the results indicated forms the subject matter of the present application which is a divisional of my co-pending application Serial No. 394,678, filed July 8, 1920.

One embodiment of my invention is illustrated in the drawings accompanying the present specification, and in which—

Figure 1 is a front elevation,

Figure 2, a rear elevation,

Figure 3, a top plan view,

Figure 4, a diagrammatic representation of a portion of the power circuit including circuit breaking stop means, Figure 5, a transverse vertical section on the line 5—5 of Figure 3, Figure 6, an end elevation showing the arrangement of the jacquard and of the electrical pattern control chart, Figure 7, a diagrammatic representation of a portion of the electrical pattern control system, Figure 8, a diagrammatic representation of a further portion of the electrical pattern control system more particularly related to the operation of the jacquard, Figure 9, a detail fragmentary view of the pattern control chart and co-operating contacts, Figure 10, a detail view partly in vertical section of the pattern control chart and contact making and breaking mechanism associated therewith, and Figure 11, a top view of the contact making and breaking mechanism associated with the pattern control chart.

Referring to the drawings, a machine embodying my invention may conveniently comprise a framework A supporting a fixed rear needle bed B and a front needle bed C preferably slidable both longitudinally and laterally (Figure 3), said needle beds being of the usual type with the needle grooves of one bed registering with corresponding needle grooves in the other bed and equipped with needle operating jacks slidable in said beds and engaging a set of needles having a hook at each end. A reciprocating carriage D is arranged above the needle beds B and C, said carriage being driven by any suitable means such as a motor E operatively connected to a drive chain 101, said chain having a slotted member 102 adapted to receive and engage the free end 103 of a lever pivotally mounted on the carriage at 104 (Figure 3). As shown more clearly in Figures 1 and 2, the chain 101 is mounted on sprockets arranged at opposite ends of the machine, said sprockets being driven by a belt or other connection with the motor E. To effect the reciprocating motion of the carriage, means are provided for periodically reversing the direction of the current through the armature of the motor thus reversing the direction of the chain 101. To accomplish this reversing operation automatically, a reversing switch is interposed in the power circuit, said switch being controlled by a double relay, indicated at F in Figure 7 of the drawings, the opposed magnets of which are alternately energized at the end of each run of the carriage, the circuit being closed through suitable contacts mounted on the framework of the machine and on the carriage respectively. However, before reversing the current in the armature of the motor, it is desirable to reduce the current or otherwise impede the movement of the carriage so as to avoid harmful impact thereof at the ends of its course. As shown in Figure 7, the motor circuit includes the conductors 105 and 106, the latter of which contains a resistance 107 and also a parallel resistance or rheostat 108 manually operative for regulative movement. To increase the resistance in the conductor 106 and thus reduce the motor speed, the rheostat 108 may be periodically cut out. This is conveniently accomplished by means of a relay including a magnet 109, said magnet being in circuit with both magnets of the double relay F and also with the fixed contact R at one end of the machine, an adjustable contact R' at the opposite end of the machine, and a movable circuit closing contact R'' mounted on the carriage D. For practical purposes, the magnet 109 and the double relay may operate substantially simultaneously. However, the action of the double relay may be effectively delayed by making the bar 110 thereof heavier than the bar 111. Thus, the current in the motor E will be reduced either simultaneously with or just before the change of the current therein. Obviously, although I have described an automatically reciprocating drive for the carriage, any other suitable means for oscillating the carriage may be employed.

In connection with the driving means, I have also provided suitable means for stopping the operation of the machine either at a predetermined point or upon the occurrence of some predetermined circumstance, such for example as the breaking of a thread or the occurrence of a drop stitch or the substantial reduction of tension on the woven fabric. For this purpose, I have interposed in the motor circuit a relay represented at G (Figures 4 and 7), and actuated by the closing of any one of a plurality of possible circuits connected electrically with the conductor 112 which in turn forms a part of the circuit including the magnet 113 and the relay G. The number of circuits so shown in Figure 4 is not intended to be a limitation upon the number which may be provided in a complete apparatus. However, as shown, each of said circuits is normally open until something happens to close it. Thus, assuming that the conductor 114 forming a part of the circuit associated with the tensioning apparatus, for example, the contact 115 may be fixed on a portion of the framework of the machine while the contact 116 may be carried by a swinging portion of the tensioning device, said contacts being normally separated while the proper degree of tension is maintained. If for some reason, the tension diminishes to such an extent that contact 116 moves into engagement with contact 115, the circuit of conductor 114 will be closed thus energizing the coil 113, whereupon the power circuit will be interrupted and the motor E will stop. Where the machine embodies a number of safety circuits and stops of substantially similar character, it will be advantageous to incorporate therein suitable signals by which the operator may ascertain the cause of the stoppage of the motor. Accordingly, an indicator or annunciator of some sort may be interposed in each of the circuits, as for example, a light 117 in the conductor 114.

Referring now to Figures 1 and 5, in which I have illustrated more clearly the tension device, it will be seen that the knitted fabric, as it hangs from the needles, may be passed between a pair of rollers 118 and 119, of which roller 118 is driven, being geared to a small motor 120 (Figure 1). The current through said motor is maintained constant during web engaging operation of the machine, the amount thereof being controlled by a suitable manually controlled rheostat. The roller 119 is preferably held in yielding engagement with the web of fabric as it passes across the roller 118. As indicated in Figure 5, the roller 119 is mounted on lever arms 121 pivoted at 122. Another pair of levers 123 pivoted at 124 bear against the levers 121 and are held in yielding engagement therewith by means of springs 125. The pivots 122 are permitted to slide to the required degree in a slot 126. Thus, the roller 119 may be operated manually either to engage or to disengage the web of fabric between said roller and the roller 118 and, when in web engaging position, said roller 119 will exert a yielding pressure against the web as the latter is fed between said rollers due to the rotation of the roller 118, driven by the continuously operating motor 120, which as soon as the slack is taken up, will exert a steady tension or torque on the fabric. The mechanical part of the stop motion mechanism hereinabove described in connection with the tensioning apparatus includes a cross bar 127 suspended between a pair of levers 128 pivotally mounted on the framework of the machine and in such position that they will actuate one of the movable contacts 116 when the cross bar 127 is deflected a predetermined amount by relaxation of the tension on the web. In operation, when the tension apparatus is effective, the cross bar 127 will be held in such a position that the contacts 115 and 116 will be separated. If for any reason, the tension is relaxed, the contacts will be closed and the driving motor E will be stopped in the manner hereinabove described.

Suitable stop motions are associated with the thread feed. For example, referring to Figures 1, 3 and 6, the yarn or thread to be used in the operation of the machine may be withdrawn through suitable fixed thread guides 130 and 131, adjacent to yielding thread guides 132 and 133, at the opposite ends of which are electrical contacts normally open while the thread is being withdrawn or held in position for withdrawal by the thread carriers. However, if a thread breaks, the yielding guide 133 will be deflected away from the direction of movement of the thread and the contact at its opposite end will be moved to close the circuit of conductor 112 as explained in connection with the operation of the stop motion of the tension device.

In addition to the automatic features associated with the reversing mechanism, I have also provided automatic means for controlling and actuating in predetermined succession those parts of the device which operate more particularly to form the fabric and to govern the character of the pattern thereof. This automatic control is effected through a combination of electrical and mechanical arrangements which are measurably simpler than those commonly utilized for a similar purpose in the knitting art and, at the same time effect a highly desirable uniformity and certainty of operation. The control apparatus, according to my invention, co-operates with the driving mechanism in such a manner that the necessary changes of certain parts are effected at the proper time to secure the desired design of fabric and also to prevent injury to the machine, the latter result being accomplished through the instrumentality of suitable safety devices. The general scheme of control includes a system of circuits each having one set of contacts which engage according to a predetermined arrangement, so that no change is effected unless both sets of contacts are in engagement simultaneously. Referring to Figures 2 and 7 of the drawings, the periodically operating contacts are represented at H, J and K, the contacts H being fixed at one end of the machine, the contacts J being slidably mounted at the other end of the machine, so that the length of stroke of the carriage may be varied, and the contacts K being mounted on the carriage to reciprocate therewith. Thus, some of the contacts K engage all of the contacts H at each stroke toward the left end of the machine, while some of the contacts K engage all of the contacts J at each stroke toward the right end of the machine.

All of the contacts H and J are in circuit with a rotating drum 201, the details of which are more clearly disclosed in Figures 9 to 11 inclusive. Intermittent movement is imparted to the drum 201 by suitable means connected with the reciprocating carriage and operated thereby. Thus, the carriage is provided with an upwardly projecting cam shaped member 202 (Figure 2) which moves in the path of a lever 203 (Figure 3) and deflects one end of said lever upwardly. This lever 203 is securely fastened to a rod 204 (Figure 2) journaled in the framework of the machine and having a lever arm 205, Figure 5, secured at one end. A link 206 pivoted at 207 imparts a rocking motion to a shaft 209 upon which is secured a pawl carrier 208 (Figure 10). A pawl 210 mounted on carrier 208 is held by means of a spring 230 in engagement with a ratchet 211 which is operatively connected to the drum 201 and imparts intermittent movement to said drum to the extent of one step during each stroke of the carriage. A contact carrier 212 is mounted adjacent to the drum 201 and is provided with a plurality of perforations adapted to accommodate plunger contacts 213 normally pressed toward the drum by means of springs 214. The carrier 212 is pivotally mounted at 215 and is connected to the pawl carrier 208 by means of a link 216. A spring 217 may be provided to hold the contact carrier normally in position to permit the plunger contacts 213 to engage the peripheral surface of the drum 201 through pattern controlling perforations hereinafter referred to, or, in the absence of perforations, to engage the surface of a pattern chart 218 arranged to cover the surface of said drum. A yielding detent 219 engages the ratchet 211 to prevent lost motion. As indicated in Figure 9, the pattern chart 218 is provided with perforations 220 which receive corresponding sprocket projections 221 extending from the peripheral surface of the drum 201. The surface of the chart may be provided with transverse and longitudinal markings 231 and 232, respectively, by which the pattern controlling perforations 222 and 223 may be more readily located and identified as to function. In the embodiment of my invention illustrated in the drawings, the pattern chart will move twice between each two of the perforations 220. In other words, the pattern chart will travel a distance equal to the distance between two perforations 220 during a complete oscillation of the carriage D, but the movement will take place in two increments. Thus, a change perforation 222 occurring on the same transverse line with the perforations 220 will indicate a change to be effected at the end of a run of the carriage in one direction while a change perforation 223 indicates a change to be effected at the end of a run of the carriage in the opposite direction.

In operation, the plunger contacts 213 normally bear yieldingly against the surface of the pattern chart 218 or against the drum 201 when the perforations 222 and 223 come into register with said plunger contacts, the latter in this position extending through said perforations and in each case, closing a circuit. The operation of rotating the drum takes place intermediate the ends of the carriage runs so that, when the carriage reaches one end or the other of its course, one or more pattern or other changes will take effect, depending upon the number and identity of perforations through which the plungers 213 are properly projecting into contact with the drum 201. Simultaneously with the rotary movement of the drum caused by movement of the pawl 210, I raise one end of the contact carrier 212 by means of the link 216 connected with the pawl carrier 208 and against the tension resistance of the spring 217. This raising of the carrier elevates the contacts 213 out of engagement with the drum or the pattern sheet, as the case may be, and serves to prevent sparking at the points of the contacts 213 upon making and breaking contact with the drum, as well as to prevent possible injury to the pattern sheet by the dragging of the points during rotation of the drum.

From the foregoing description of my improved knitting machine and its method of operation, it will be clear that the present invention contributes materially to the successful operation of a full automatic machine in that it provides a device for controlling the changes in the stitch forming means to produce variety of pattern. The operation is partly mechanical and partly electrical, the circuits being opened and closed in predetermined sequence both as to each other and as to characteristic movements of the machine.

The ordinary knitting machine usually comprises stitch forming means or instrumentalities such as needles, jacks for operating the needles and thread carriers, together with instrumentalities for actuating these devices either manually or automatically or both. The size of a given stitch depends on the degree to which the needle is retracted by the operation of the cams on the cam carriage.

One of the objects of the present invention is to effect automatic control of changes in the positions of said cams or to control the movement of said cams from one position to another to produce different stitch lengths. Similarly, knitted fabric patterns are varied by changing the position or direction of the stitch by running the machine "on flat" or on "links links". It is a further object of the present invention to provide means for controlling changes effecting the relative position or the direction of the stitch. In hand operated and partly automatic machines various expedients are used to form stitches in one direction or the other but I have illustrated a jacquard movement for this purpose. By the operation of my improved controlling apparatus, I automatically set the jacquard mechanism in operation at predetermined points, besides automatically making adjustments of the jacks which are usually required before effecting changes from flat to links links, for example.

Obviously, other change movements of the stitch forming mechanism may be controlled in a similar manner, and as I have set forth in my specification above. It may be noted here that the devices for effecting the various changes such as thread change, lock change, stitch length change and jacquard form the subject matter of separate applications which are also divisionals of my original application hereinabove referred to.

I claim as my invention:

1. In a knitting machine, the combination of stitch forming means, means for moving the stitch size and relative position determining portions of said stitch forming means, and electrically actuated means for selectively operating said moving means for the stitch size and relative position determining means, including magnets operatively arranged in relation to said moving means and in circuit with a plurality of contacts and a common contact, circuit breaking means movable between said plurality of contacts and the common contact and means cooperating with said circuit breaking means for closing said circuits in predetermined sequence.

2. In a knitting machine, the combination of stitch forming means, means for moving the stitch size and relative position determining portions of said stitch forming means, and electrically actuated means for selectively operating said moving means for the stitch size and relative position determining means, including magnets operatively arranged in relation to said moving means and in circuit with a plurality of yielding contacts and a common rotatable contact, a contact separating member movable with the rotatable contact and interposed between said rotatable contact and the yielding contacts, said separating member having perforations movable to positions opposite the yielding contacts to close the circuits in predetermined sequence.

3. In a knitting machine having a reciprocating cam carriage, the combination of change mechanism and means for actuating the same including magnetic elements disposed in separate circuits and contact making and breaking mechanism for said circuits comprising a pattern sheet, a common terminal for all circuits at one side of said sheet and a plurality of separate terminals at the other side thereof, said sheet having perforations arranged in predetermined position to permit contact between the common terminal and selected separate terminals and means cooperating with the carriage for advancing said pattern sheet intermittently 4. In a knitting machine having a reciprocating cam carriage, the combination of change mechanism and means for actuating the same including magnetic elements disposed in separate circuits and contact making and breaking mechanism for said circuits comprising a pattern sheet, a common terminal for all circuits at one side of said sheet and a plurality of separate terminals at the other side thereof, means for intermittently advancing the pattern sheet with respect to said separate terminals, and means for retaining said terminals out of engagement with the pattern sheet while said sheet is being moved.

5. In a knitting machine having a reciprocating cam carriage, the combination of change mechanism and means for actuating the same including magnetic elements disposed in separate circuits and contact making and breaking mechanism for said circuits comprising a pattern sheet, a common terminal for all circuits at one side of said sheet and a plurality of separate terminals at the other side thereof, means for intermittently advancing the pattern sheet with respect to said separate terminals, and means for retaining said terminals out of engagement with the pattern sheet while said sheet is being moved, said means including a support for the separate terminals and means for moving said support away from the path of the pattern sheet during advancing movement of said sheet.

6. In a knitting machine the combination of change mechanism and electrically actuated means for selectively effecting operation of said change mechanism including a plurality of circuits, a common terminal for said circuits, separate terminals for said circuits, and a pattern sheet interposed between said common terminal and said separate terminals and having means for permitting contact to be established between said common terminal and predetermined separate terminals, said sheet being provided with markings to indicate the character of the change to be effected by any given contact permitting means.

7. In combination in a knitting machine, knitting instruments, a plurality of yarn feed fingers, means for changing the position of the yarn feed fingers including in part mechanical power operated connections and in part electric-magnetic selecting means, and pattern mechanism for controlling the energizing of the electro-magnetic means, substantially as described.

8. In combination in a knitting machine, knitting instruments, a pluralty of yarn feed fingers, connections operated by mechanical power for throwing said feed fingers into and out of work, and electro-magnetic means interposed in said connections and forming a part thereof for rendering the said mechanical power connections effective or ineffective, and pattern mechanism for controlling the energizing of said electro-magnetic means, substantially as described.

9. In combination in a knitting machine, knitting instruments, a plurality of feeds, and means for rendering the feeds effective or ineffective in a prescribed order, including in part mechanical power operated connections and in part electro-magnetic selecting means, and pattern mechanism for controlling the energizing of the electro-magnetic means, substantially as described.

10. In combination in a knitting machine, knitting instruments, a plurality of feeds for striping the fabric, connections operated by mechanical power for controlling the feeds, to knit or not to knit, electro-magnetic means interposed in said connections and forming a part thereof for rendering said mechanical power connections effective or ineffective, and pattern mechanism for controlling the energizing of said electro-magnetic means, substantially as described.

In testimony whereof, I have signed my name to this specification this 13th day of July, 1921.

WILLIAM FELS.